(12) United States Patent
Amir et al.

(10) Patent No.: US 8,856,076 B2
(45) Date of Patent: Oct. 7, 2014

(54) RENDERING TAPE FILE SYSTEM INFORMATION IN A GRAPHICAL USER INTERFACE

(75) Inventors: Arnon Amir, Saratoga, CA (US); Philipp Herget, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 313 days.

(21) Appl. No.: 13/162,716

(22) Filed: Jun. 17, 2011

(65) Prior Publication Data

US 2012/0323934 A1 Dec. 20, 2012

(51) Int. Cl.
*G06F 17/30* (2006.01)
*G11B 27/10* (2006.01)
*G11B 27/032* (2006.01)
*G11B 27/34* (2006.01)

(52) U.S. Cl.
CPC .... *G06F 17/30091* (2013.01); *G06F 17/30126* (2013.01); *G11B 27/107* (2013.01); *G11B 2200/95* (2013.01); *G11B 27/032* (2013.01); *G11B 27/34* (2013.01)
USPC ........... 707/636; 707/630; 707/634; 707/707; 707/739

(58) Field of Classification Search
USPC .......................... 707/634, 630, 636, 707, 739
See application file for complete search history.

(56) References Cited

U.S. PATENT DOCUMENTS

| | | | |
|---|---|---|---|
| 5,146,561 A | 9/1992 | Carey et al. | |
| 6,633,440 B2 | 10/2003 | Yanagita | |
| 6,862,656 B2 * | 3/2005 | Trimmer et al. | ............... 711/111 |
| 6,980,987 B2 | 12/2005 | Kaminer | |
| 7,280,293 B2 | 10/2007 | Nylander-Hill et al. | |
| 7,538,966 B2 | 5/2009 | Day | |
| 7,844,702 B1 * | 11/2010 | Manczak et al. | ............... 709/224 |

OTHER PUBLICATIONS

Linear Tape File (LTFS) Format Specification, LTFS Format version 2.0.0, Mar. 11, 2011).*
Linear Tape File (LTFS) Format Specification (LTFS Format version 2.0.0, Mar. 11, 2011).*
"HP LTFS Linear Tape File System user guide", http://bizsupport2.austin.hp.com/bc/docs/support/SupportManual/c02262008/c02262008.pdf, Second edition; Sep. 2010, pp. 1-22.

* cited by examiner

*Primary Examiner* — Sana Al Hashemi
(74) *Attorney, Agent, or Firm* — Francis Lammes; Stephen J. Walder, Jr.; Randall J. Bluestone

(57) ABSTRACT

A mechanism is provided for rendering tape file system information. The mechanism obtains a list of one or more files residing on a tape in the tape file system from a file directory. The mechanism obtains location information associated with at least one file of the one or more files. Finally, the mechanism renders a representation of the location information with the at least one file.

19 Claims, 11 Drawing Sheets

FIG. 3A
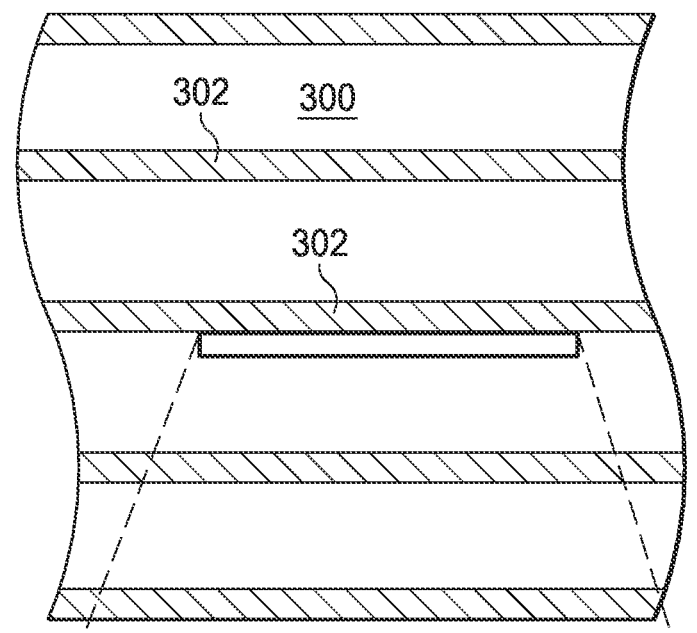
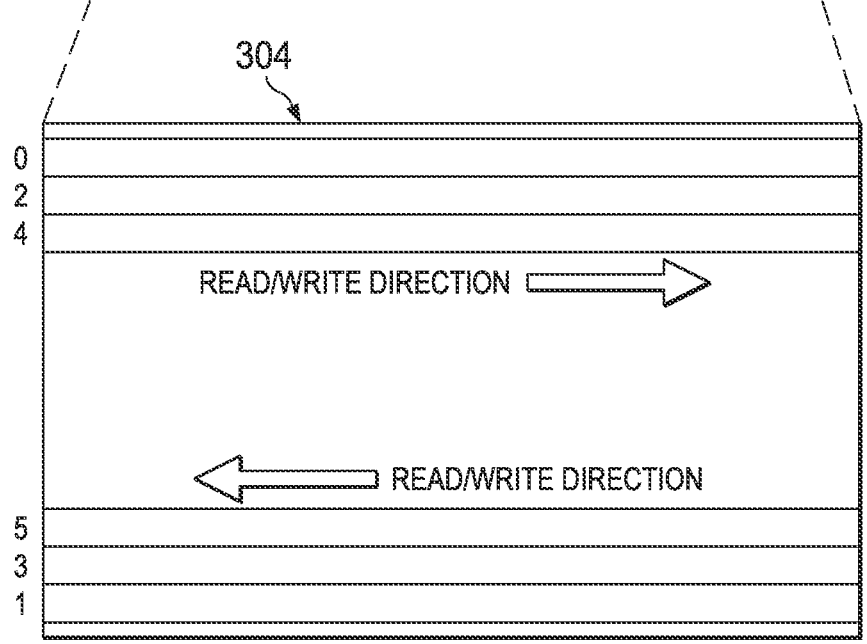
FIG. 3B

RENDERING TAPE FILE SYSTEM INFORMATION IN A GRAPHICAL USER INTERFACE

BACKGROUND

The present application relates generally to an improved data processing and presentation apparatus and method and more specifically to mechanisms for rendering information regarding objects stored in linear storage media.

Linear storage media may include magnetic tape storage, such as the Linear Tape Open (LTO). In general, data is stored on linear storage tape in blocks of fixed or variable size. Managing data blocks on linear storage tape may be done in various ways, such as using the Tape Archive Format (TAR), a data backup system, a data storage system, as well as a file system on tape. The Long Term File System (LTFS) is a file system that allows a user to store individual files to a tape, in the same manner as files are stored on other file-based storage device, such as a hard disk, a FLASH memory, a Solid State Drive (SSD) or any other conventional file storage medium. To use a tape cartridge with LTFS, the cartridge has to first be formatted, similar to formatting of hard drives. A formatted tape may be loaded into a drive, mounted by LTFS as a file system, and then be accessed and used to store and retrieve files.

Tape drives however, have a slow access time and behave very differently than these other storage devices. When reading a file, the tape drive has to seek to the file location before the reading of the file may occur. This seek operation may take anywhere from seconds to minutes depending on the file location on the tape relative to the current position of the tape.

The manipulation of data in a data processing system is well known in the prior art. Data may be manipulated in many ways in a modern state-of-the-art data processing system including: data accessing, data encoding, data communications, data compression, data conversion, data entry, data exchange, data filing, data linking, data locking, data manipulation, data mapping, data modeling, data processing, data recording, data sorting, and data transferring. The large amounts of data that are available to the user of modern state-of-the-art data processing system often become overwhelming in magnitude and complexity. These situations may often arise in the creation and execution of multimedia presentations.

Data processing systems are capable of communicating information to users in many formats, including: text, graphics, sounds, animated graphics, synthesized speech, and video. Multimedia presentations employ a data processing system to combine such information formats into a coherent and comprehensive presentation to the user.

As a result of the increasing complexity of data processing systems and with the introduction of multimedia presentations, attempts have been made to simplify the interface between a user and the large amounts of data present within a modern data processing system. One example of an attempt to simplify the interface between a user and a data processing system is the utilization of a so-called graphic user interface (GUI) to provide an intuitive and graphical interface between the user and the data processing system. A GUI is an interface system, including devices, by which a user interacts with a system, system components, and/or system applications via windows or view ports, icons, menus, pointing devices, etc.

SUMMARY

In one illustrative embodiment, a method, in a data processing system, is provided for rendering tape file system information. The illustrative embodiment obtains a list of one or more files residing on a tape in the tape file system from a file directory. The illustrative embodiment obtains location information associated with at least one file of the one or more files. The illustrative embodiment renders a representation of the location information with the at least one file.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 3A shows the layout of the tape in the LTO format specification in accordance with an illustrative embodiment;

FIG. 3B shows an enlargement of a region that a single read/write element would interact with while writing in one data band in accordance with the LTO format and an illustrative embodiment;

DETAILED DESCRIPTION

Currently, a single user interface is used for both disk file systems and tape file systems. However, disk and tape file system are considerably different in their behavior. Specifically, tape file systems have much longer access time and require more time for certain operations. The illustrative embodiments provide a mechanism for rendering tape file system information and presenting the information to the user before and/or during a file opening, reading, and writing operation. As an example, tape specific information may include tape drive status and current operation, tape position during a seek operation, location of files on the tape, location of the tape head itself, or the like.

The interface allows a user of a tape file system to know how long it will take to open a file before or even after selecting the file. During file access, the user may expect to wait while the system appears to not respond during the seek operation. Knowing the delay time in advance makes interactions with the file system more efficient and pleasant.

As an example of improved efficiency, the illustrative embodiments examine situations in which a user wants to open several files for reading. The illustrative embodiments provide a user interface that allows a user to view a graphical representation of the location of the files on the tape. This user interface allows the user to open the files in an order that the files are positioned on the tape, minimizing the total seek time, which could save considerable time overall. It should be apparent to one skilled in the art that any of the embodiments presented may also be applied to other types of file systems which have a longer access time or have otherwise substantially different behavior than a disk or flash file systems.

Figure 1:
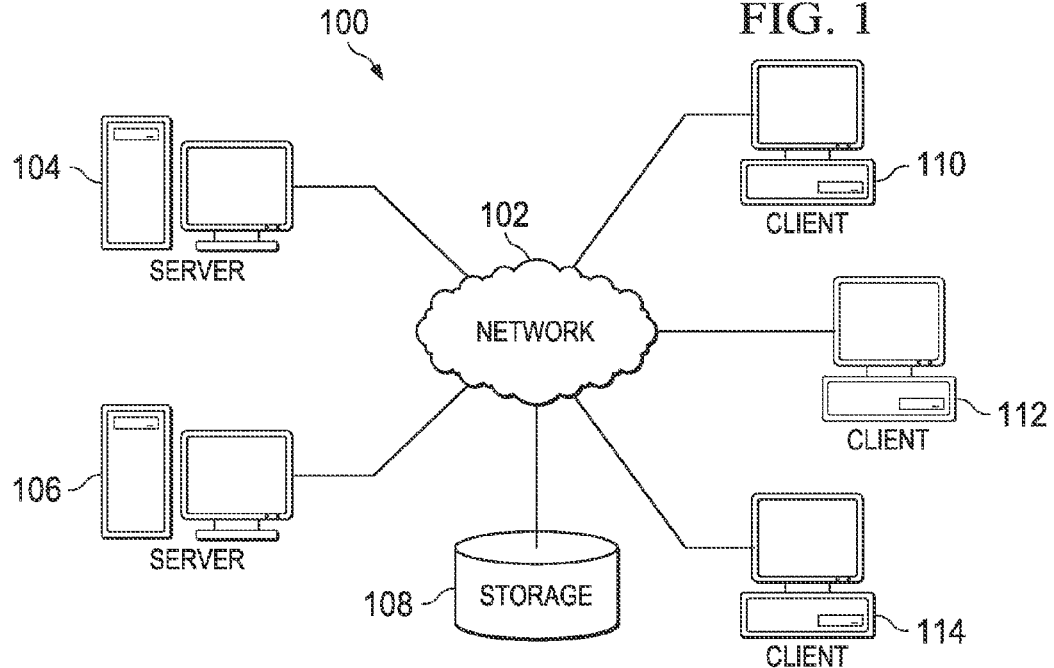
FIG. 1 depicts a pictorial representation of an example distributed data processing system in which aspects of the illustrative embodiments may be implemented.
Figure 2:
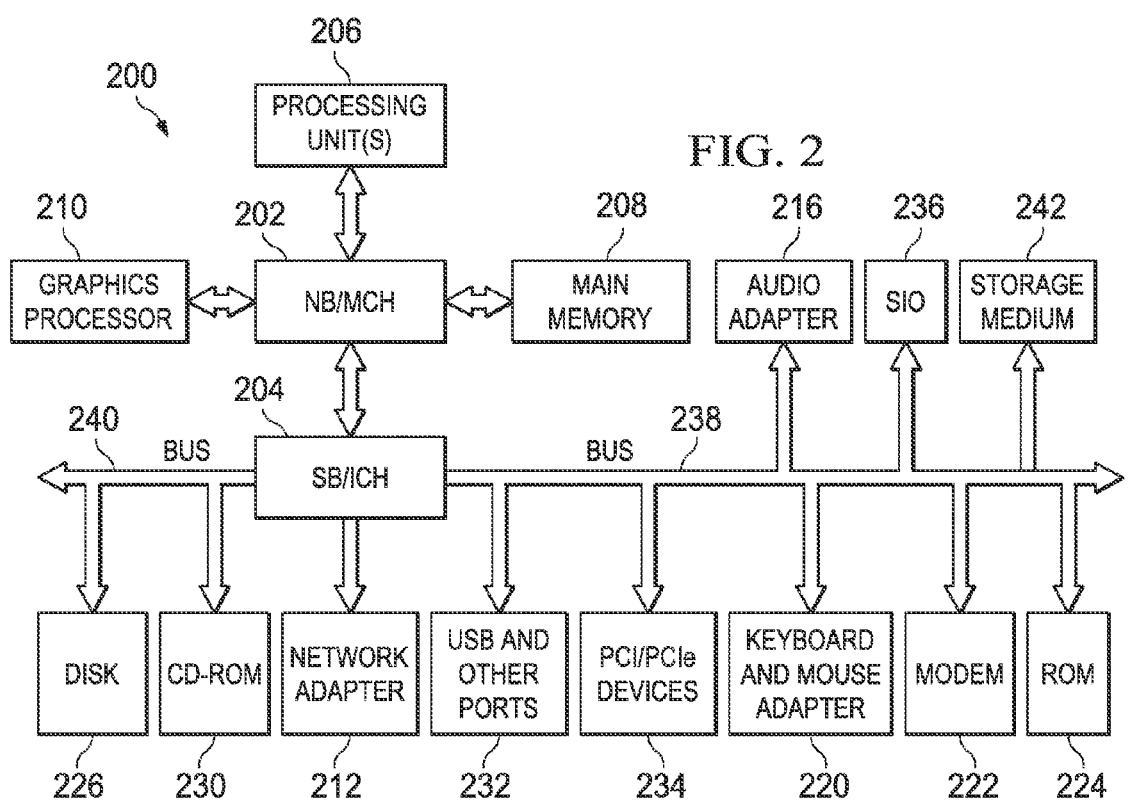
FIG. 2 shows a block diagram of an example data processing system in which aspects of the illustrative embodiments may be implemented.

The illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1-2 are only examples and are not intended to assert, or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an example data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, storage medium 242, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204. In accordance with the illustrative embodiments, storage medium 242 may be a magnetic tape storage device.

An operating system runs on processing unit 206. The operating system coordinates and provides control of various components within the data processing system 200 in FIG. 2. As a client, the operating system may be a commercially available operating system such as Microsoft Windows 7 (Microsoft and Windows are trademarks of Microsoft Corporation in the United States, other countries, or both). An object-oriented programming system, such as the Java programming system, may run in conjunction with the operating system and provides calls to the operating system from Java programs or applications executing on data processing system 200 (Java is a trademark of Oracle and/or its affiliates.).

As a server, data processing system 200 may be, for example, an IBM® eServer™ System p® computer system, running the Advanced Interactive Executive (AIX®) operating system or the LINUX operating system (IBM, eServer, System p, and AIX are trademarks of International Business Machines Corporation in the United States, other countries, or both, and LINUX is a registered trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

The Linear Tape Open (LTO) standard is an open standard that allows for interchangeability of tape cartridges between drives. FIG. 3A shows the layout of the tape in the LTO format specification in accordance with an illustrative embodiment. The format specifies four data bands 300 sandwiched between five servo bands 302. A tape drive designed to read the LTO format typically has a head assembly containing multiple rows of read and or write elements. Each row has one or more servo read elements at either end of a group of read and/or write elements. The servo readers are positioned to allow simultaneous alignment with any two adjacent servo tracks during operation. This places the read/write elements over the corresponding data tracks within a data band. The data band can thus be selected by choosing the appropriate set of servo tracks.

Data is written to 8 or 16 tracks simultaneously. The tracks are spaced evenly throughout the data band. The set of tracks written at the same time is referred to as a "wrap". FIG. 3B shows an enlargement of a region that a single read/write element would interact with while writing in one data band in accordance with the LTO format and an illustrative embodiment. During the writing of a wrap, element 304 will follow a single track on the tape. The tracks that are written during alternate forward and reverse wraps are labeled in the figure with the respective wrap numbers: 0, 1, 2, 3, 4, 5, etc. Wraps are written sequentially and serpentine fashion starting with the top and bottom of each data band for the forward and reverse directions respectively. Subsequently written tracks partially overlap earlier tracks in a shingling fashion. In this manner, the written tracks may be narrower than the width of the writer.

When the first data band is filled, the head is moved to the second data band and a new set of wraps is written. Taking LTO-5 as an example, the total number of tracks on the tape is (4 data bands)×(20 wraps per band)×(16 tracks per wrap) =1280. Since 16 tracks are written simultaneously, 80 passes are required to fill the tape.

Figure 4:
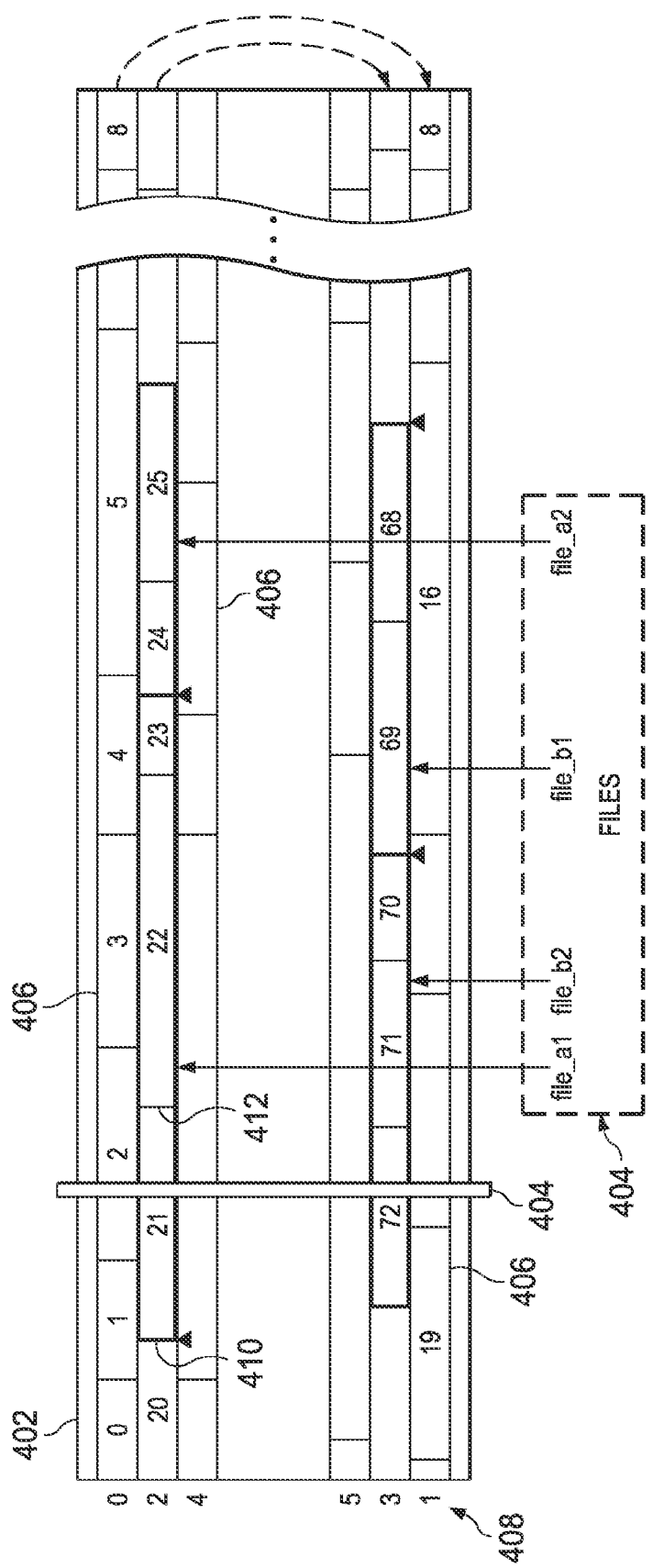
FIG. 4 depicts an example showing how one of the write elements writes data to a section of tape in the LTO format and also in accordance with the a Linear Tape File System (LTFS) specification and an illustrative embodiment.

Building on the LTO format specification, there may be additional file system specifications. One such specification which will be used here as an illustrative example is the long term file system (LTFS). FIG. 4 depicts an example showing how one of the write elements writes data to a section of tape in the LTO format and also in accordance with the LTFS specification and an illustrative embodiment. As tape 402 moves past read/write head 404, the read/write head 404 writes to tape 402 in sequential logical blocks 406, of constant or varying size, numbered sequentially with Block Numbers (BN). Read/write head 404 writes content to tape 402 in a serpentine fashion, along wraps 408. Each travel to the end and back of the linear tape 402 covers two wraps.

As tape 402 moves, the relative location of the magnetic head on the tape is measured and denoted by a LPOS (Longitudinal Position). The LPOS starts at the beginning of the tape with one integer value and linearly increases toward the end of tape. Hence, the physical location of a logical block 406 on linear tape 402 may be characterized by its wrap number and a beginning LPOS and an end LPOS of the logical block 406, for example, beginning LPOS 410 and ending LPOS 412.

The Linear Tape File System (LTFS) format is for storing data on tape. The LTFS format may apply to tapes having two partitions: an Index partition and a Data partition. The Index partition is in general smaller in size, and is used primarily to store the files index and metadata about files. The Data partition is used primarily to store the file content and may consist of the remaining space available on the tape. For example, with LTO-5 tapes, the Index partition may consist of two wraps, amounting to about 47 GB, and the Data partition may consist of 76 wraps. Another two wraps are used as a buffering zone between the two partitions, for a total of 80 wraps on tape. The LTFS index contains information about files and directories stored on tape, such as file names, file size, date of last change, and other file properties. The LTFS index may further contain Extended Attributes (EAs), which may be defined by LTFS itself, by the operating system, by various applications, or directly defined by users. An EA may comprise a name and value pair, and may be used to store metadata and other information for the use by systems, applications, and users.

The LTFS index further contains information about the location of the file's content on tape, represented by an extents list. In LTFS, each file may contain one or more extents, where each extent is a contiguous sequence of one or more logical blocks 406 on linear tape 402. An extent may be represented by its beginning block number and its end block number. An extent may start at the beginning of its first block or within a specified bytes offset inside its first block. Similarly, an extent may end at the end of its last block or at a specified offset inside its last block. A file may have multiple extents for multiple reasons, for example, appending content to an existing file on tape, modifying a file on tape, or while writing multiple files in parallel, interleaving extents from all files. All the information pertaining to the files on tape 402 is then stored on tape 402 in the file Index.

Due to the serpentine writing on tape, any file (extent or block) may be located at any position on tape 402. Note that because of wrapping, two files may have two very different block numbers 406 but may be physically located very closely on tape 402, for example, on two different wraps but with the same LPOS.

The reader may be aware that the order of blocks, extents or files by their begin-block number may differ from their order by LPOS which reflects their arrangements of position on tape. For example, consider the four files 404. Their order by beginning block number would be file_a1 (block number 21), file_a2 (block number 24), file_b1 (block number 68), and lastly file_b2 (block number 70). However, when these four files are sorted by LPOS position on tape, the order would be, from left to right, file_a1, file_b2, file_a2, and lastly file_b1. While begin-block and LPOS provide two different methods to sort a list of files stored on tape, there may be many other ways to sort such lists. Furthermore, similar ordering methods may apply not only to lists of files stored on the tape but also to individual extents, blocks, and other objects stored on tape. One of ordinary skill in the art would be able to apply similar properties to other linear data storage media, partially-linear data storage and other serial data storage systems.

For simplicity, the remaining discussion is directed to files with a single extent. However, it should be clear that illustrative embodiments apply to any set of files, such as single extent files, multiple extent files, groups of files (e.g. all files in a directory), groups and sub-groups of blocks (e.g., only the begin-blocks of all JPEG files in a directory), or to any other types of objects written to tape 402.

Figure 5:
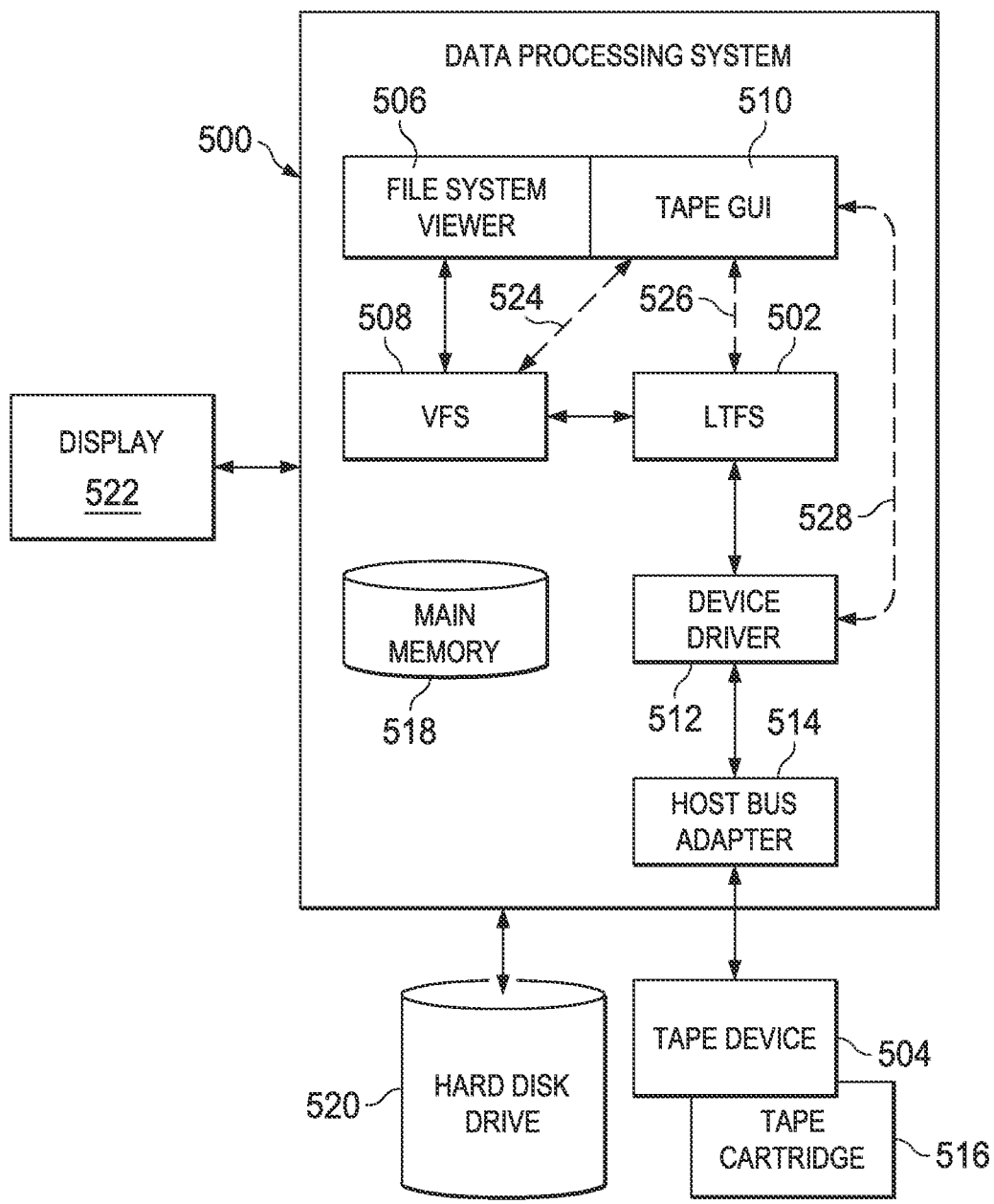
FIG. 5 depicts a functional block diagram of a Linear Tape File System (LTFS) that uses a LTFS rendering mechanism and a graphical user interface in accordance with an illustrative embodiment.

FIG. 5 depicts a functional block diagram of a linear tape file system (LTFS) that uses a rendering mechanism and a graphical user interface in accordance with an illustrative embodiment. While the following illustration depicts components of Linear Tape File System (LTFS) 502 residing within the data processing system 500, the illustration is solely intended for illustration purposes in order to indicate how the components needed to render linear tape file information interact. That is, one or more of the components shown within data processing system 500 may reside within a data processing system to which a tape device 504 is coupled, within the tape device itself, or a combination of the data processing system and the tape device.

Data processing system 500 comprises file system viewer 506 and virtual file system (VFS) 508. File system viewer 506 provides browsing of file systems, directories, and listing files. VFS 508 module provides for receiving file system commands, such as Portable Operating System Interface (POSIX) commands from applications such as tape graphical user interface (GUI) 510. VFS 508 also provides for routing commands to any of a plurality of file systems present to data processing system 500, such as a disk or a tape file system, and returning information such as directory listings, file properties and/or file content to the file system viewer or other application. In this illustration, the file system commands are routed by VFS 508 to LTFS 502, which interprets, executes and responds to these commands. LTFS 502 communicates with tape device 504 via device driver 512 and host bus adapter 514, together facilitating the logical and physical communication between data processing system 500 and tape device 504 comprising tape cartridge 516.

LTFS 502 may maintain a files index and directory of the tape's content in main memory 518, on hard disk drive 520, a flash memory (not shown in the figure), and/or on any other storage device. LTFS 502 is capable of creating, reading, writing and updating files and directories, as well as the index, as POSIX commands are processed and executed. LTFS 502 keeps the index consistent with the files and the content on the tape cartridge 516.

File system viewer 506 has a graphical user interface for rendering information in visual form on the display 522. As described previously, as LTFS 502 writes files to tape cartridge 516, read/write heads within tape device 504 write to the tape within tape cartridge 516 in sequential logical blocks, of constant or varying size, numbered sequentially with Block Numbers (BN). As each file is written to the tape within tape cartridge 516, LTFS 502, as part of its regular process, records these block numbers in the extents list associated with the file. LTFS 502 maintains this information for all files on the tape as part of the tape index. Again, a particular file may be represented by multiple blocks in one sequential series, denoted as a single extent, or by multiple sequences of blocks at various locations on the tape, regarded as multiple extents.

In current systems, the physical position is managed inside tape device 504 and is not exposed to the operating system of a data processing system. Thus, in the illustrative embodiments, LTFS 502 obtains this information by sending a command along with the write of the file to the tape within tape cartridge 516 so that tape device 504 will return the longitudinal position of the file once the file is written to the tape within tape cartridge 516. This command may be in the form of a Small Computer System Interface (SCSI) command, a pass-through command, or any other suitable command, and may be passed through the main drive interface, or a secondary communication channel to the drive such as RS232, USB or Ethernet, or be communicated in various other ways. Thus, after tape device 504 writes the file to the tape within tape cartridge 516, tape device 504 passes longitudinal positions (LPOS) information associated with the file to LTFS 502. Tape device 504 may also pass information such as logical position, block number, data band number, wrap number, partition, file marks, and/or physical position. LTFS 502 then records the location information associated with the file information in the files index and directory of the tape's content to include the location information received from tape device 504. This information may be kept as part of the LTFS Index on tape, or using EAs for the file, or using other data structures, indexes, and/or files.

Since a file may comprise multiple extents, then a file may also have multiple longitudinal positions associated with the file. For example, each extent may be associated with one LPOS indicator such as its begin LPOS, or with two LPOS indicators, one for its begin LPOS and a second one for its end LPOS. Additionally, various points of reference in the file, including such points represented by their byte offset from the beginning of the file, may also be associated with the LPOS corresponding to the longitudinal location of those points on the tape. Additionally, if a file has already been written to the tape within tape cartridge 516 without the associated longitudinal position information been appended to the file information in file index, LTFS 502 may send a request to tape device 504 for the block numbers and longitudinal positions associated with the file. Once LTFS 502 captures the block numbers and longitudinal positions associated with a file, consequent requests for LPOS information do not require access to tape device 504 as the LPOS of a BN is determined when the block was written to the tape within tape cartridge 516 and does not change in future mounts and accesses of the tape within tape cartridge 516.

Finally, to create a graphical representation of the files on the tape within tape cartridge 516, tape graphical user interface (GUI) 510 uses the information stored by LTFS 502 in the LTFS Index about each file on the tape within tape cartridge 516 to render a graphical representation on display 522. This representation may be incorporated as part of the graphical user interface of file system viewer 506. For example, based on selected user preferences, tape GUI 510 may render a rectangle that represents the tape within tape cartridge 516 as well as a marker within the rectangle that represents the relative longitudinal position of the file on the tape within tape cartridge 516 in addition to providing a name of the file, a size of the file, a type of the file, created date, modified date, or the like. Tape GUI 510 may also render information such as logical position, block number, data band number, wrap number, partition, file marks, or physical position. In another example, in addition to providing the location of the file on the tape within tape cartridge 516, graphical user interface may provide a location of the read/write heads in relation to the tape within tape cartridge 516 as well as information on the estimated time it will take to access the specified file. The estimated time is based on the location of the read/write heads in relation to the longitudinal position of the file, a time it will take to arrive at the desired longitudinal position of the file, and the time it takes to change to the desired data band.

In yet another embodiment, rather than providing a graphical representation of the longitudinal location of the file on the tape, Tape GUI 510 may provide a representation of the block number(s) (BN) associated with the files. While not directly pointing to physical location on device driver 512, providing block numbers may be helpful in sorting files to reduce seek time during multi-file read. The use of BNs has the advantage of not requiring LPOS information. BNs may be used when LPOS information is not available. Furthermore, tape GUI 510 may manually or automatically switch between using LPOS and BN information. For example, at first access to a tape volume after mount, Tape GUI 510 may first check if LPOS information is available for this volume by sending a request to LTFS 502 and receiving a response. The request may be passed via VFS 508 (indicated by connection 524) or may be directly routed to LTFS 502 (indicated by connection 526) through appropriate LTFS application programming interface (API). If LPOS information is available, tape GUI 510 would use LPOS information for its rendering. If however LPOS information is not available for this tape, tape GUI 510 would use BN for rendering.

In other embodiments, tape GUI 510 may obtain LPOS information directly from tape device 504 via device driver 512 (indicated by connection 528) without requesting LPOS information from LTFS 502 or VFS 508. For example, tape GUI 510 may send a request containing one or more BN numbers and receive a response containing the LPOS numbers corresponding to the begin LPOS and end LPOS of these blocks. Tape GUI 510 may further record the received LPOS information in EAs of files, therefore keeping the LPOS information collocated with the files index. One advantage of this embodiment is that this embodiment is agnostic to the file system implementation, by LTFS 502 or other, as this embodiment does not rely on the file system to provide or to maintain the longitudinal location information of files.

It is understood that, in addition to LPOS and BN discussed here, other metrics, measures, or indicators of file and other object's locations on tape may be defined. These may be similarly used with tape GUI 510 in accordance to this invention without need for substantial change from the description provided herein, and would therefore be considered other embodiments of this invention.

In one embodiment, file location information may be available for only a portion of the files. However, an estimated longitudinal position of a file/extent/block associated with a block number may be calculated using methods of interpolation and extrapolation applied to other files having both block numbers and longitudinal information available. One simple example is estimating the LPOS of the second of three consecutive files on tape as the mean of LPOS-s of the first and third files. File and extent sizes may also be used in such calculation.

In another embodiment, tape GUI 510 may provide a graphical representation of the tape within tape cartridge 516 that illustrates the positions of multiple files on the tape within tape cartridge 516 by using connectors from each file in a list file to their location on the graphical representation of the tape within tape cartridge 516. In this embodiment, a user may scroll the representation of the tape within tape cartridge 516 to a desired position and then tape GUI 510 will display all files that reside before and after that location and their respective locations using connectors. The user may further reduce or increase the number of files displayed by zooming in or out on the representation of the tape within tape cartridge 516. When the zoom feature is used, tape GUI 510 may create another representation that represents the zoomed portion in relation to the whole length of the tape within tape cartridge 516. Further, the user may select how the files are sorted, such as based on a name of the file, a size of the file, a type of the file, created date, modified date, or the like. Further, tape GUI 510 may indicate the current position of the read/write head, or whether the read/write heads are stationary or moving as well as a direction of movement.

Thus, the illustrative embodiments provide a mechanism for rendering tape file system information, which presents important location specific information to the user both before and during a file opening process. That is, in order to access and read a file from a linear tape, a linear tape open (LTO) drive has to move the tape from its current position to the begin LPOS of the file, possibly move the head from its current wrap/data band to the block's wrap/band, and possibly to reverse the direction of tape motion, if the read direction for this wrap is different from the seeking direction. Each of these mechanical operations takes time. The time may vary depending on the amount of motion needed, such as the location the tape needs to be moved to, the data bands and wraps to change to, and many other factors. Therefore, the illustrative embodiments provide a user interface that allows a user to view a graphical representation of the location of the files on the tape so that the user could choose to open the files in an order that the files are positioned on the tape or perform other actions during the time required to access a file.

Although LTO and LTFS are used as an example to illustrate the various aspects of this invention, the embodiments herein are not limited to these technologies. In general, the embodiments herein may be applied to any tape standard and any tape files system, as would be clear to someone skilled in the art. For example, the illustrative embodiments may be used for optical tape systems or other slow storage device systems that are not necessarily tape related systems.

Figure 6:
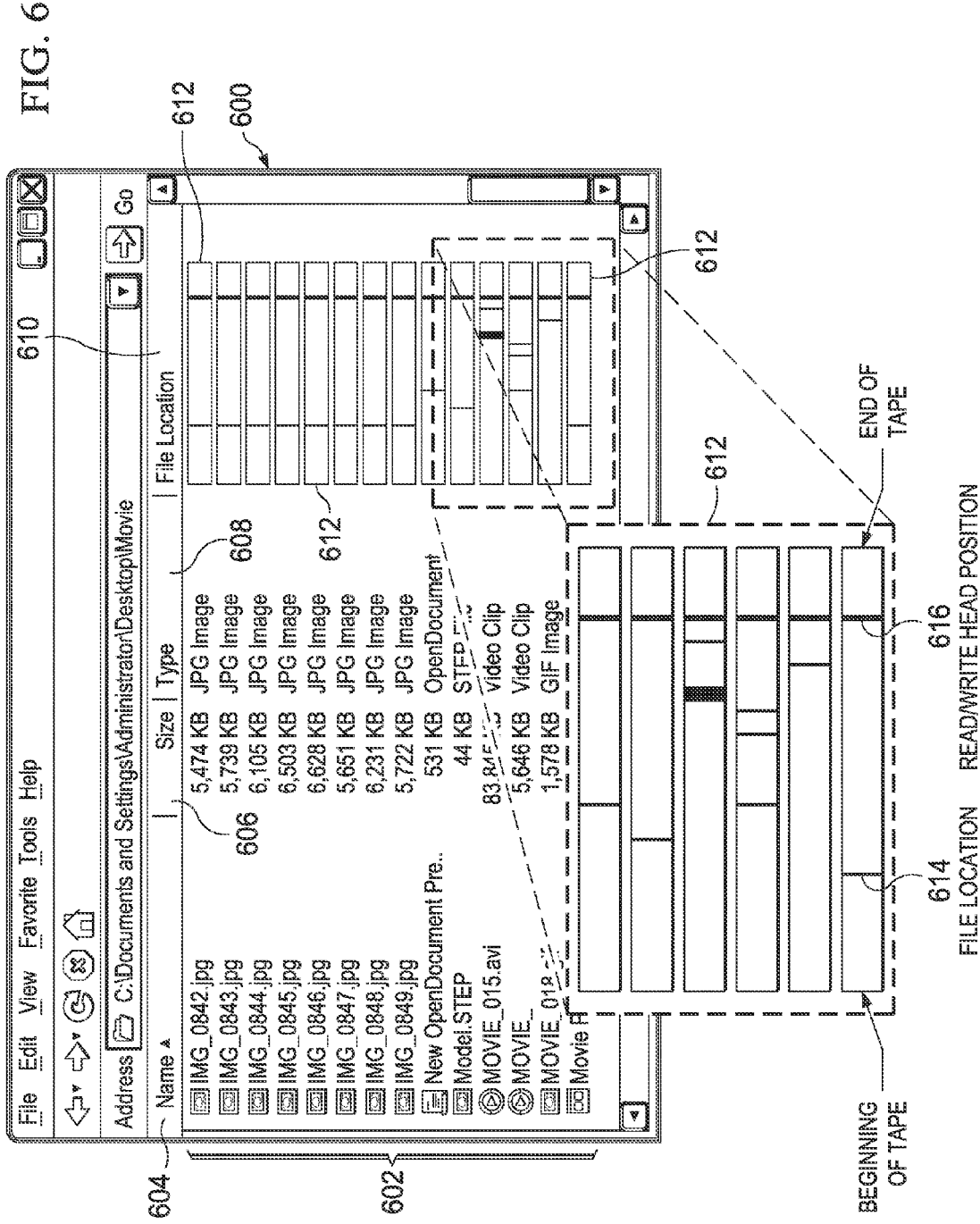
FIG. 6 depicts a first graphical representation of files on a tape system rendered by a graphical user interface in accordance with an illustrative embodiment.

FIG. 6 depicts a first graphical representation of files on a tape system rendered by a graphical user interface, such as tape GUI 510 of FIG. 5, in accordance with an illustrative embodiment. Graphical user interface 600 illustrates a subset of files 602 located on the tape. Each file is represented by name 604, size 606, type 608, and file location 610. File location 610 comprises one rectangle 612 for each file, showing the positions of the file 614 and the read/write head 616. The length of each rectangle 612 represents the full length of the tape. Files that are broken into multiple extents can optionally be represented by several rectangles showing the various locations on the tape. As the tape spools, the position of the rectangle representing the read/write head 616 may move within rectangle 612. If the user were to open one of the image files, the user would see the position of read/write head 616 move toward the position of file 614 as the system waits for the tape to seek. When the head arrives at the file location the file would then open.

Figure 7:
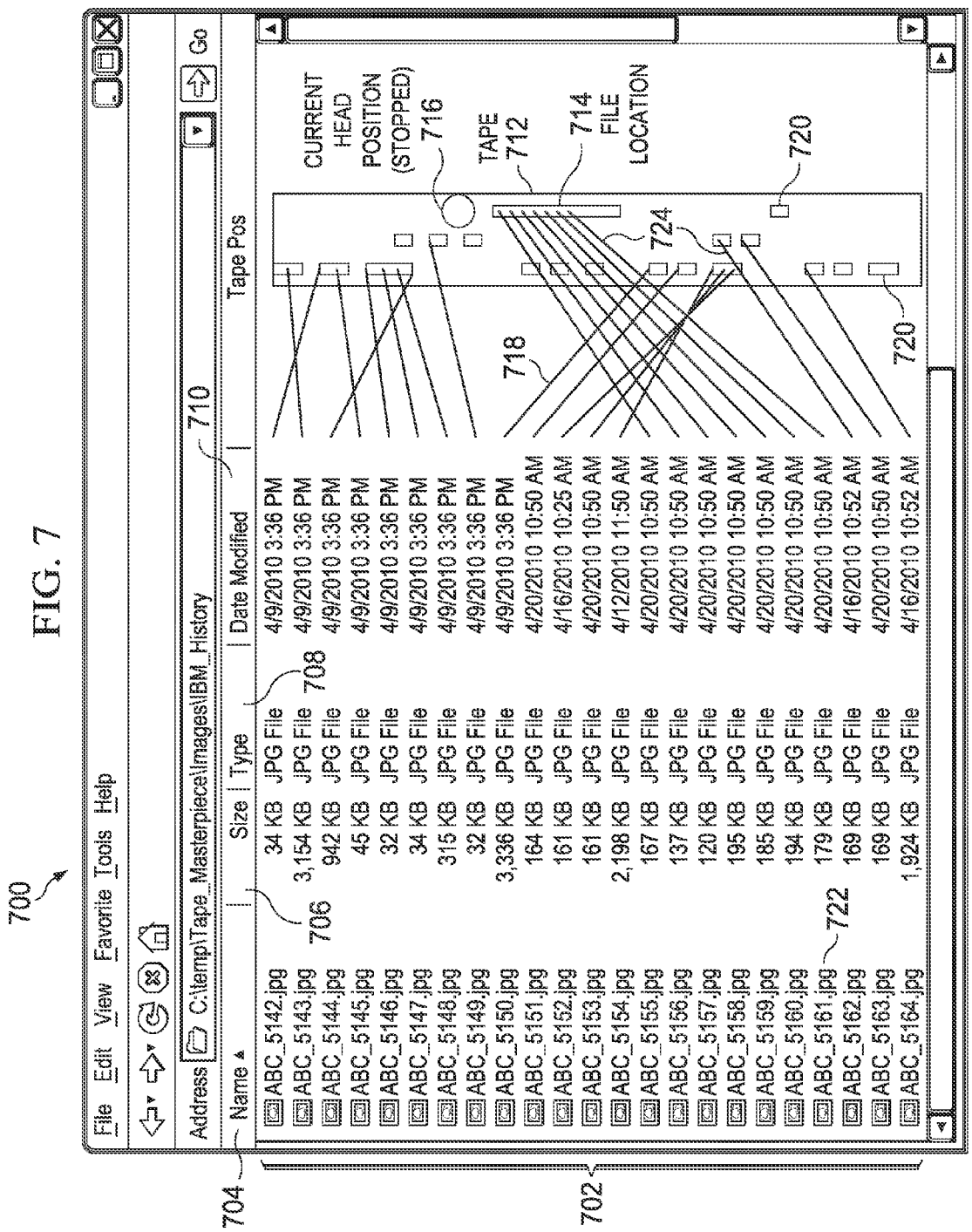
FIG. 7 depicts a second graphical representation of files on a tape system rendered by a graphical user interface in accordance with an illustrative embodiment.

FIG. 7 depicts a second graphical representation of files on a tape system rendered by a graphical user interface, such as tape GUI 510 of FIG. 5, in accordance with an illustrative embodiment. Graphical user interface 700 illustrates a subset of files 702 located on the tape. Each file is represented by name 704, size 706, type 708, and date modified 710. Also within graphical user interface 700 is a graphical representation 712 of the tape showing the file positions on the tape. Graphical representation 712 shows longitudinal positions 714 of multiple files within one area of the tape. While graphical representation 712 represents a section of the tape containing the files that are in the current view, other embodiments may be provided where the entire tape is represented.

The vertical portion of each longitudinal position 714 represents the position down the length of the tape and the horizontal portion represents the position across the tape. The horizontal portion of each longitudinal position 714 may be used to represent the data band in which the file resides or the wrap in which the file resides. While not illustrated, graphical representation may also render only the vertical portion of longitudinal positions 714 without regard to any horizontal distinction. Note that although not present in all of the figures, a representation of the position of the data across the tape may be applied to any of the embodiments of this patent, such as the rectangle in FIG. 6.

Additionally, in graphical user interface 700, each file location associated with each file in subset of files 702 is identified by connection 718, which may be a line, an arrow, or the like, to denote which file corresponds to each location. Rectangles 720 in graphical representation 712 represent files that are in the current directory (the one being viewed), but are past the scroll bars. Also, as described previously, a file may have multiple extents, which is illustrated by file 722 and connections 724.

Further, graphical user interface 700 shows the location of the read/write head 716 with respect to the files on the tape. Graphical user interface 700 also shows a current action of the read/write head, such as stopped or moving along with direction of movement. In graphical user interface 700, the indication is that the read/write head 716 is stopped represented by the circle symbol. However, the movement of the read/write head 716 may also be represented by an arrow indicating the direction of movement. In one embodiment, graphical representation 712 represents only the section of tape containing files 702. As the window is scrolled to view different files, the entire scale of graphical representation 712 may change to accommodate the files within the current window. In another embodiment where graphical representation 712 represents the entire tape, new vertical portion of longitudinal positions 714 are added and others are taken away as files come into and leave the current window.

Figure 8:
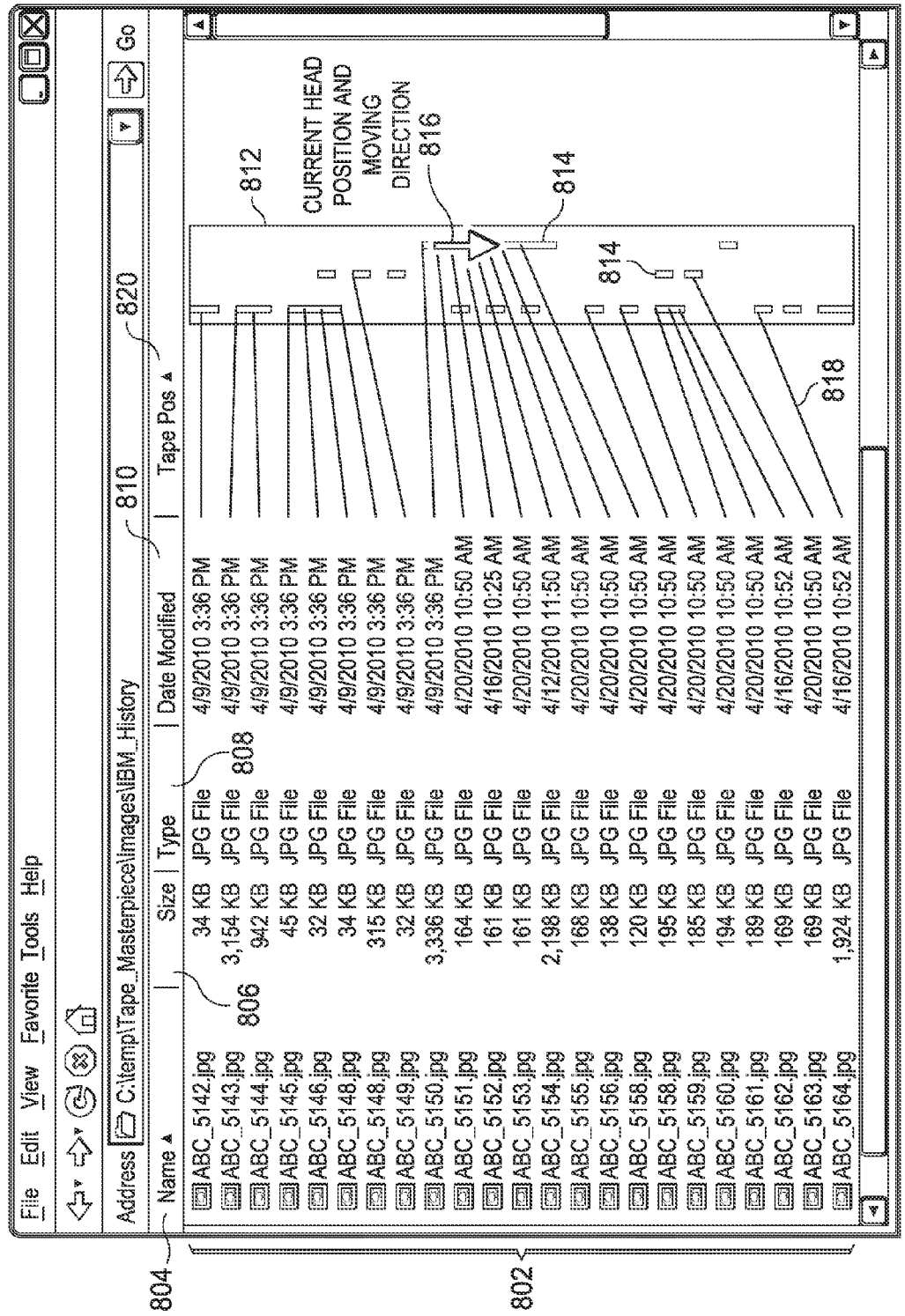
FIG. 8 depicts a third graphical representation of files on a tape system rendered by a graphical user interface in accordance with an illustrative embodiment.

FIG. 8 depicts a third graphical representation of files on a tape system rendered by a graphical user interface, such as tape GUI 510 of FIG. 5, in accordance with an illustrative embodiment. Graphical user interface 800 is similar to graphical user interface 700 of FIG. 7, in that graphical user interface 800 illustrates a subset of files 802 located on the tape. Each file is represented by name 804, size 806, type 808, and date modified 810. Also within graphical user interface 800 is a graphical representation 812 of the tape showing the file positions on the tape. Graphical representation 812 shows longitudinal positions 814 of multiple files within one area of the tape. The vertical portion of each longitudinal position 814 represents the position down the length of the tape and the horizontal portion represents the position across the tape. The horizontal position may be used to represent the data band in which the file resides or the wrap in which the file resides.

As with graphical user interface 700 of FIG. 7, in graphical user interface 800, each file location associated with each file in subset of files 802 is identified by connection 818, which may be a line, an arrow, or the like, to denote which file corresponds to each location. However, in graphical user interface 800, subset of files 802 have been sorted based upon their position on the tape, which may be an efficient access order. In graphical user interface 800, sorting by file size may be accomplished for example by clicking on tape position column 820. Further, graphical user interface 800 shows the location of the read/write head 816 with respect to the files on the tape. Graphical user interface 800 also shows a current location and action of read/write head 816, such as stopped or moving along with direction of movement. In graphical user interface 800, the indication is that the read/write head 816 is moving along with the direction of movement.

Figure 9:
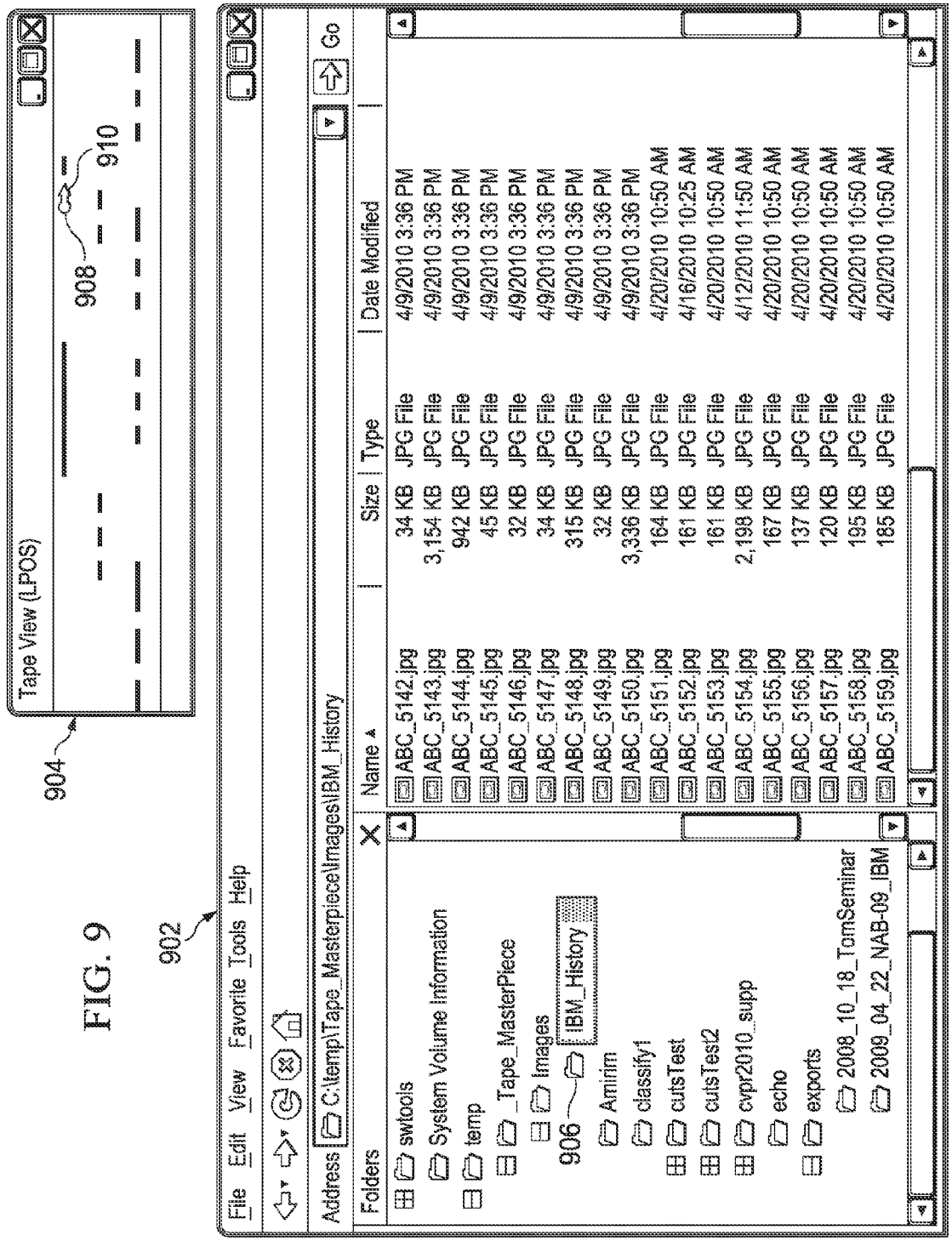
FIG. 9 depicts a second way of implementing the graphical user interface in accordance with an illustrative embodiment.

FIG. 9 depicts a second wray of implementing the graphical user interface in accordance with an illustrative embodiment. In this embodiment, window 902 is provided for the selection of a file while window 904 is provided for position information. In the implementation, the file(s) and/or directory may be selected in window 902, while the location information associated with the file(s) or files within the directory is presented in window 904. Note that although a separate GUI window is shown, the information may be placed in other locations convenient to the user, such as the desktop, taskbar, or system trays. In the particular implementation, directory 906 is selected in window 902 and the location of the files within the directory is represented in window 904. The representation shown in this example is similar to the representation of FIG. 8, but in general, any of the representations of any of the embodiments can be used. Also shown in window 904 are the current head position 908 and the direction that the head is moving 910.

Figure 10:
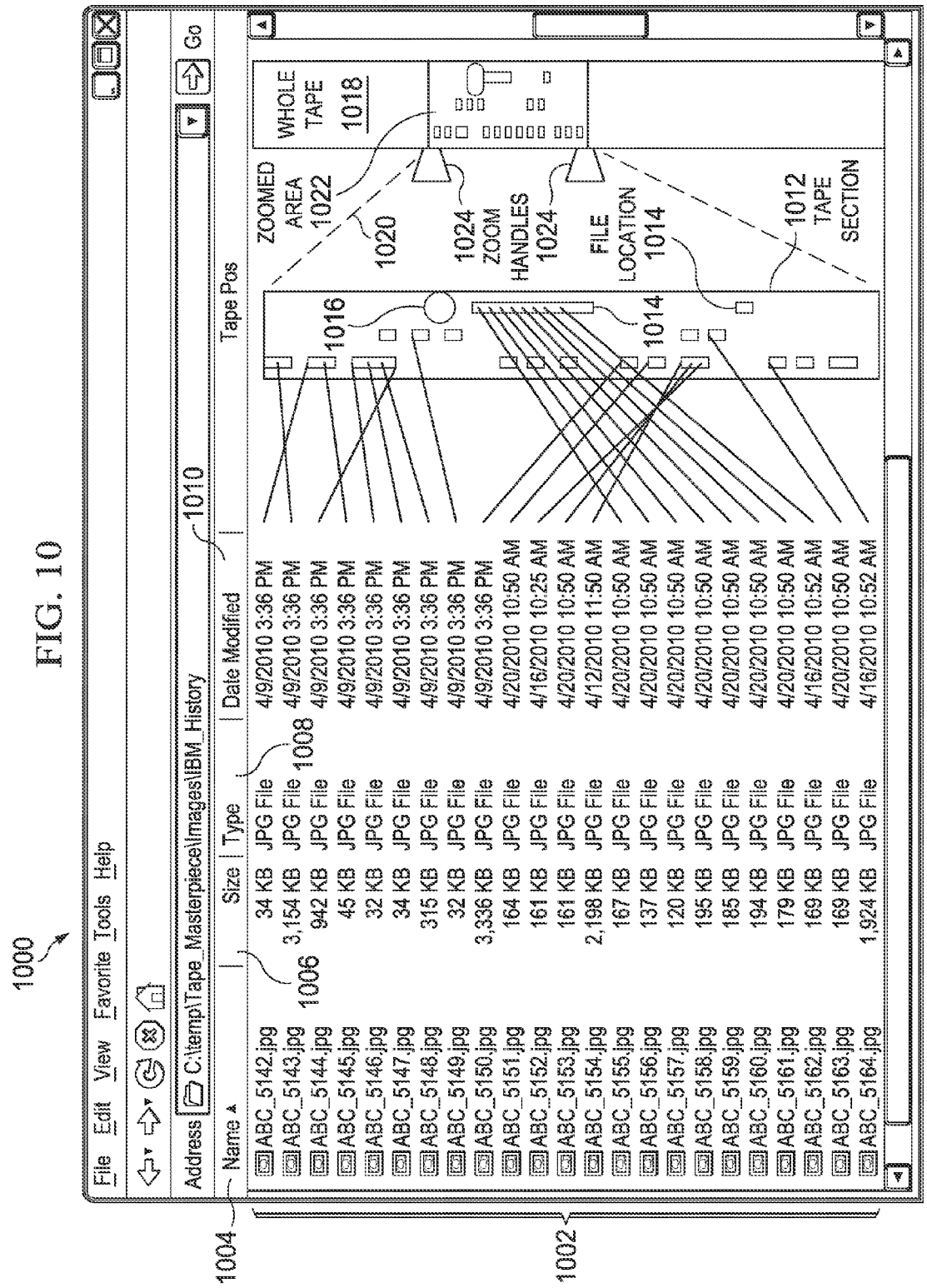
FIG. 10 depicts a fourth graphical representation of files on a tape system rendered by a graphical user interface in accordance with an illustrative embodiment.

FIG. 10 depicts a fifth graphical representation of files on a tape system rendered by a graphical user interface, such as tape GUI 510 of FIG. 5, in accordance with an illustrative embodiment. Graphical user interface 1000 is similar to graphical user interfaces 700 and 800 of FIGS. 7 and 8, in that graphical user interface 1000 illustrates a subset of files 1002 located on a linear tape. Each file is represented by name 1004, size 1006, type 1008, and date modified 1010. Also within graphical user interface 1000 is a graphical representation 1012 of the tape showing the file positions on the tape. Graphical representation 1012 shows longitudinal positions 1014 of multiple files within one area of the tape. The vertical portion of each longitudinal position 1014 represents the position down the length of the tape and the horizontal portion represents the position across the tape. The horizontal position may be used to represent the data band in which the file resides or the wrap in which the file resides and is an optional component of the user interface.

In graphical user interface 1000, graphical representation 1012 shows an enlarged view of a section of the tape with the longitudinal positions 1014 of multiple files within one area of the tape as well as an indication is that read/write head 1016 is stopped represented by the circle symbol. Also in graphical user interface 1012 is graphical representation 1018 that illustrates the entire length of the tape and the section of the tape with which graphical representation 1012 is associated. As is shown in graphical user interface 1000, zoom lines 1020 are provided to show which area of the tape the graphical representation 1012 is associated with. Further graphical user interface 1000 provides for the selection of the zoomed area so that a user may change the location and zoomed area by clicking and dragging on the area box 1022 as well as providing zoom handles 1024 so that a user can adjust the area within the zoomed area. Graphical user interface 1000 also provides for changing the location and size of the zoomed area automatically based on subset of file 1002 that are shown in graphical user interface 1000.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 11:
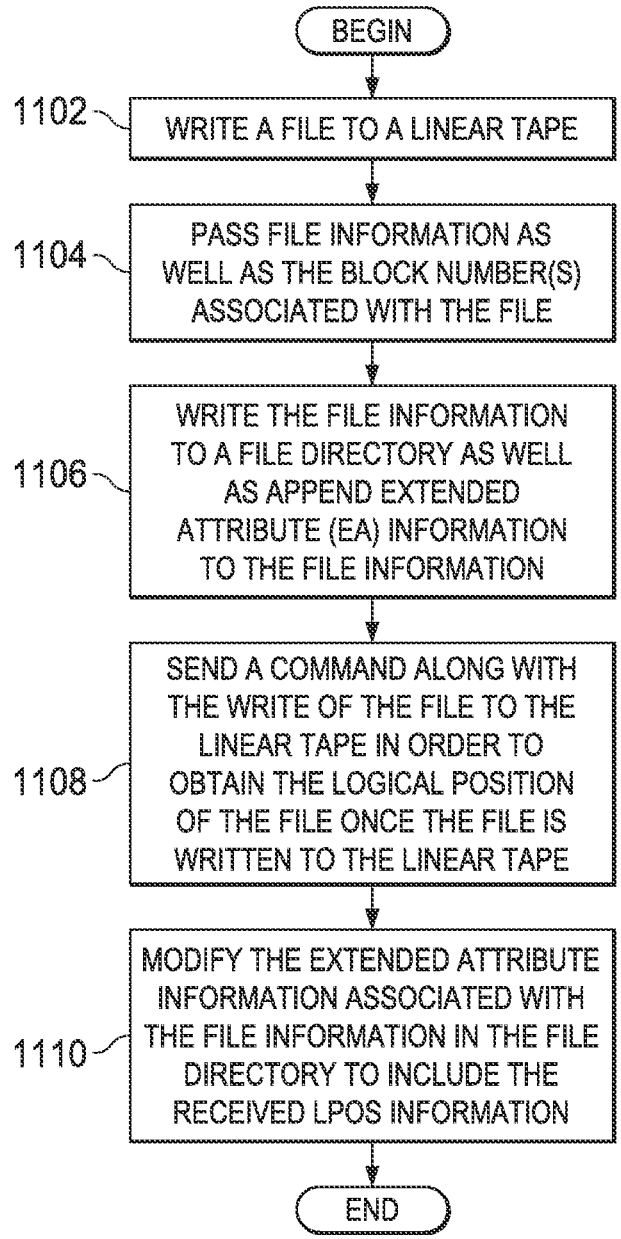
FIG. 11 depicts an exemplary flow diagram of the operation performed by a Linear Tape File System (LTFS) in storing tape file system information associated with a new file in accordance with an illustrative embodiment.

FIG. 11 depicts an exemplary flow diagram of the operation performed by a Linear Tape File System (LTFS) in storing tape file system information associated with a new file in accordance with an illustrative embodiment. As the operation begins, the LTFS system writes a file to a linear tape (step 1102). This may be performed through the LTFS instructing the Linear Tape Open (LTO) device to write the file, which the LTO device accomplishes by using the write heads to write to the linear tape in sequential logical blocks, of constant or varying size, numbered sequentially with Block Numbers (BN). As each file is written to the linear tape, the LTFS system passes file information as well as the block number(s) associated with the file to a LTFS rendering mechanism (step 1104). Upon receiving the file information and the block number information, the LTFS rendering mechanism writes the file information to a file directory as well as appends extended attribute (EA) information to the file information, the extended attribute information comprising at least the block numbers associated with the file (step 1106).

The LTFS rendering mechanism further obtains longitudinal position information associated with the file by sending a command along with the write of the file to the LTO device so that the LTO device will return the longitudinal position of the file once the file is written to the linear tape (step 1108). The LTFS rendering mechanism then modifies the extended attribute information associated with the file information in the file directory to include the LPOS information received from the LTO device (step 1110), with the operation terminating thereafter.

Figure 12:
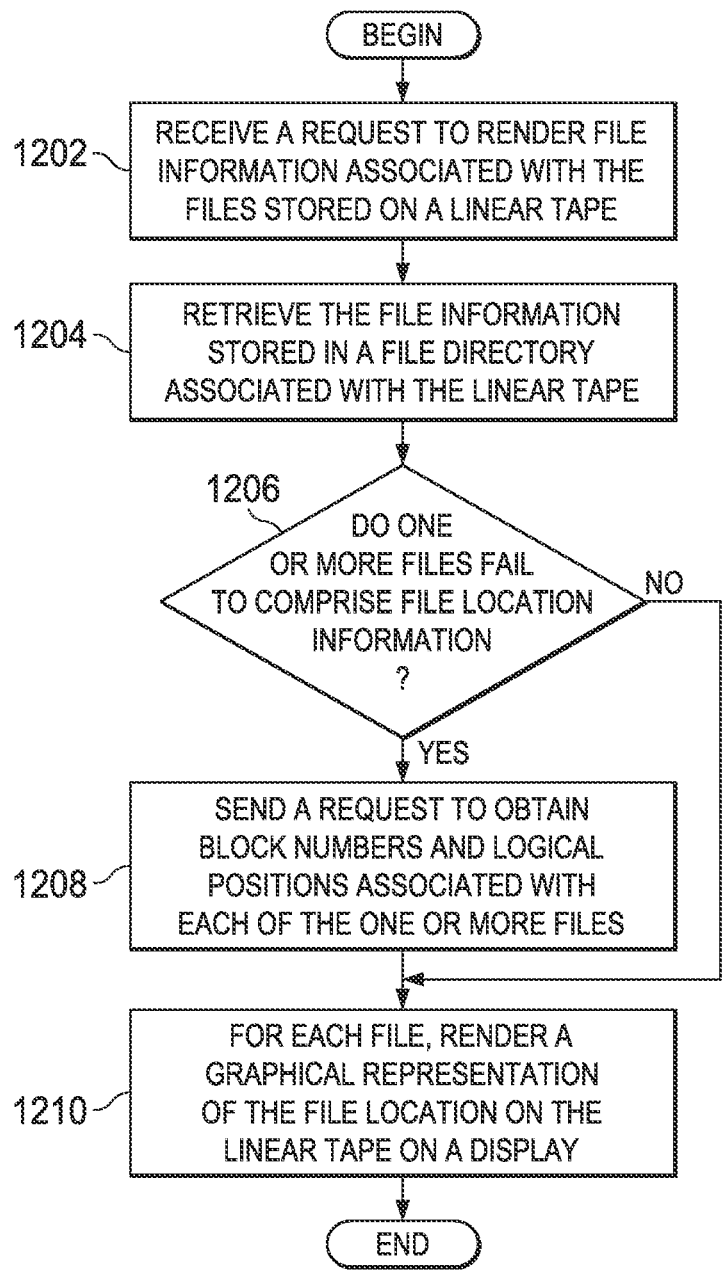
FIG. 12 depicts an exemplary flow diagram of the operation performed by a Linear Tape File System (LTFS) in rendering tape file system information in a graphical user interface in accordance with an illustrative embodiment.

FIG. 12 depicts an exemplary flow diagram of the operation performed by a Linear Tape File System (LTFS) in rendering tape file system information in a graphical user interface in accordance with an illustrative embodiment. As the operation begins, the LTFS system receives a request to render file information associated with the files stored on a linear tape (step 1202). The LTFS system retrieves the file information stored in a file directory associated with the linear tape (step 1204). The LTFS system determines whether file location information is stored in extended attribute information associated with each of the files in the file directory (step 1206). If at step 1206 there are one or more files that do not have file location information stored in an extended attribute associated with that file, then the LTFS system sends a request to the LTO device in order to obtain block numbers and longitudinal positions associated with each of the one or more files (step 1208). From step 1208 or if at step 1206 all of the files have file location information stored in an extended attribute, a graphical user interface of the LTFS system uses the information stored in the extended attribute associated with each file to render a graphical representation of the file location on the linear tape on a display (step 1210). The graphical user interface renders the file location information based on user selected preferences, many of which are described with regard to FIG. 4-8. The rendered file location information may change as the user changes the user preferences. Therefore, the operation only terminates after the user closes the graphical user interface.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide a mechanism for rendering tape file system information, which presents important location specific information to the user both before and during a file opening process. That is, the illustrative embodiments provide a user interface that allowrs a user to view a graphical representation of the location of the files on the tape so that the user could choose to open the files in an order that the files are positioned on the tape or perform other actions during the time required to access a file.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for rendering tape file system information, comprising:
    obtaining a list of one or more files residing on a tape in the tape file system from a file directory;
    obtaining location information associated with at least one file of the one or more files;
    rendering a representation, in a graphical user interface, of a portion of the tape and the location information associated with the at least one file residing on the portion of the tape; and rendering, in the graphical user interface, information related to a state the tape file system, wherein the information related to the state of the tape file system comprises one or more of tape head position relative to the representation of the tape, direction and velocity of tape motion relative to the representation of the tape, time to access the one or more files, elapsed time, or read progress.

2. The method of claim 1, wherein the rendering of the location information associated with the at least one file residing on the portion of the tape in the graphical user interface comprises one or more of longitudinal position associated with the at least one file residing on the portion of the tape, logical position associated with the at least one file residing on the portion of the tape, block number associated with the at least one file residing on the portion of the tape, data band number associated with the at least one file residing on the portion of the tape, wrap number associated with the at least one file residing on the portion of the tape, partition associated with the at least one file residing on the portion of the tape, file marks associated with the at least one file residing on the portion of the tape, or physical position associated with the at least one file residing on the portion of the tape.

3. The method of claim 2, wherein the rendering of the location information associated with the at least one file residing on the portion of the tape in the graphical user interface is displayed relative to a section of the tape in which the at least one file resides.

4. The method of claim 1, wherein the location information is further rendered, in the graphical user interface, in at least one of a textual manner or a numerical manner.

5. The method of claim 1, wherein the rendering, in the graphical user interface, of the representation of the location information of the one or more files on the tape in the tape file system is updated as the tape is moving within the tape file system.

6. The method of claim 1, further comprising:
responsive to the one or more files in the file directory failing to have file location information in the extents list associated with each file, sending a request to obtain the location information associated with each file from a tape drive in the tape file system;
storing the location information associated with each file in the extents list associated with each file.

7. The method of claim 1, further comprising:
sorting the one or more files by physical position information, wherein the physical position information is at least one of block numbers or longitudinal position.

8. The method of claim 1, further comprising:
responsive to a user selecting multiple files, sorting, by the processor, the one or more files in an efficient access order.

9. The method of claim 1, wherein the location information associated with the at least one file of the one or more files is obtained from an extents list associated with the at least one file.

10. A computer program product comprising a computer readable storage medium having a computer readable program stored therein, wherein the computer readable program, when executed on a computing device, causes the computing device to:
obtain a list of one or more files residing on a tape in the tape file system from a file directory;
obtain location information associated with at least one file of the one or more files;
render a representation, in a graphical user interface, of a portion of the tape and the location information associated with the at least one file residing on the portion of the tape; and
render, in the graphical user interface, information related to a state of the tape file system, wherein the information related to the state of the tape file system comprises one or more of tape head position relative to representation of the tape, direction and velocity of tape motion relative to the representation of the tape, time to access the one or more files, elapsed time, or read progress.

11. The computer program product of claim 10, wherein the rendering of the location information associated with the at least one file residing on the portion of the tape in the graphical user interface comprises one or more of longitudinal position associated with the at least one file residing on the portion of the tape, logical position associated with the at least one file residing on the portion of the tape, block number associated with the at least one file residing on the portion of the tape, data band number associated with the at least one file residing on the portion of the tape, wrap number associated with the at least one file residing on the portion of the tape, partition associated with the at least one file residing on the portion of the tape, file marks associated with the at least one file residing on the portion of the tape, or physical position associated with the at least one file residing on the portion of the tape.

12. The computer program product of claim 11, wherein the rendering of the location information associated with the at least one file residing on the portion of the tape in the graphical user interface is displayed relative to a section of the tape in which the at least one file resides and wherein the location information is further rendered, in the graphical user interface, in at least one of a textual manner or a numerical manner.

13. The computer program product of claim 10, wherein the computer readable program further causes the computing device to:
responsive to the one or more files in the file directory failing to have file location information in the extents list associated with each file, send a request to obtain the location information associated with each file from a tape drive in the tape file system; and
store the location information associated with each file in the extents list associated with each file.

14. The computer program product of claim 10, wherein the computer readable program further causes the computing device to:
sort the one or more files by physical position information, wherein the physical position information is at least one of block numbers or longitudinal position.

15. An apparatus, comprising:
a processor; and
a memory coupled to the processor, wherein the memory comprises instructions which, when executed by the processor, cause the processor to:
obtain a list of one or more files residing on a tape in the tape file system from a file directory;
obtain location information associated with at least one file of the one or more files;
render a representation, in a graphical interface, of a portion of the tape and the location information associated with the at least one file residing on the portion of the tape; and
render, in the graphical user interface, information related to a state of the tape file system herein the information related to the state of the tape file system comprises one or more of tape head position relative to the representation of the tape, direction and velocity of tape motion relative to the representation of the tape, time to access the one or more files, elapsed time, or read progress.

16. The apparatus of claim 15, wherein the rendering of the location information associated with the at least one file residing on the portion of the tape in the graphical user interface comprises one or more of longitudinal position associated with the at least one file residing on the portion of the tape, logical position associated with the at least one file residing on the portion of the tape, block number associated with the at least one file residing on the portion of the tape, data band number associated with the at least one file residing on the portion of the tape, wrap number associated with the at least one file residing on the portion of the tape, partition associated with the at least one file residing on the portion of the tape, file marks associated with the at least one file residing on the portion of the tape, or physical position associated with the at least one file residing on the portion of the tape.

17. The apparatus of claim 16, wherein the rendering of the location information associated with the at least one file residing on the portion of the tape in the graphical user interface is displayed relative to a section of the tape in which the at least one file resides and wherein the location information is further rendered, in the graphical user interface, in at least one of a textual manner or a numerical manner.

18. The apparatus of claim 15, wherein the instructions further cause the processor to:
responsive to the one or more files in the file directory failing to have file location information in the extents list associated with each file, send a request to obtain the location information associated with each file from a tape drive in the tape file system; and
store the location information associated with each file in the extents list associated with each file.

19. The apparatus of claim 15, wherein the instructions further cause the processor to:
sort the one or more files by physical position information, wherein the physical position information is at least one of block numbers or longitudinal position.

* * * * *